US009435283B2

(12) United States Patent
Racelis et al.

(10) Patent No.: US 9,435,283 B2
(45) Date of Patent: Sep. 6, 2016

(54) METHOD FOR INFERRING BAROMETRIC PRESSURE AT LOW THROTTLE ANGLES

(71) Applicant: Ford Global Technologies, LLC, Dearborn, MI (US)

(72) Inventors: Rommel Racelis, Ann Arbor, MI (US); John Eric Rollinger, Sterling Heights, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 14/095,884

(22) Filed: Dec. 3, 2013

(65) Prior Publication Data

US 2015/0152801 A1 Jun. 4, 2015

(51) Int. Cl.
*F02D 35/02* (2006.01)
*F02D 41/24* (2006.01)
*F02D 9/02* (2006.01)
*F02D 41/22* (2006.01)

(52) U.S. Cl.
CPC ......... *F02D 41/2474* (2013.01); *F02D 41/222* (2013.01); *F02D 2009/0227* (2013.01); *F02D 2200/0406* (2013.01); *F02D 2200/0408* (2013.01); *F02D 2200/704* (2013.01); *Y02T 10/40* (2013.01)

(58) Field of Classification Search
CPC ............. F02D 9/00; F02D 2009/0227; F02D 2009/0228; F02D 2200/00; F02D 2200/02; F02D 2200/04; F02D 2200/0402; F02D 2200/0404; F02D 2200/0406; F02D 2200/0408; F02D 2200/0411; F02D 2200/703; F02D 2200/704

USPC ..... 123/406.49, 568.22, FOR. 107, 412, 677
See application file for complete search history.

(56) References Cited

U.S. PATENT DOCUMENTS

| | | | | |
|---|---|---|---|---|
| 4,600,993 A | * | 7/1986 | Pauwels | G01L 23/24 123/406.49 |
| 4,926,335 A | * | 5/1990 | Flowers | F02D 41/28 123/463 |
| 5,331,936 A | * | 7/1994 | Messih | F02D 41/18 123/480 |

(Continued)

FOREIGN PATENT DOCUMENTS

EP 1429012 A1 6/2004

OTHER PUBLICATIONS

Racelis, Rommel et al., "Method for Determining an Offset of a Manifold Pressure Sensor," U.S. Appl. No. 14/095,908, filed Dec. 3, 2013, 39 pages.

(Continued)

*Primary Examiner* — Stephen K Cronin
*Assistant Examiner* — Kevin R Steckbauer
(74) *Attorney, Agent, or Firm* — Julia Voutyras; Alleman Hall McCoy Russell & Tuttle LLP (57) ABSTRACT

Methods and systems are provided for estimating barometric pressure based on a reference barometric pressure and manifold pressures at two different altitudes. In one example, a method may include adjusting an operating condition of the engine based on barometric pressure during engine operation at throttle angles less than a threshold, the barometric pressure based on a current manifold pressure relative to a reference manifold pressure at a current throttle angle and reference barometric pressure. Further, the method may include adjusting a manifold pressure sensor output based on an offset of the manifold pressure sensor.

20 Claims, 6 Drawing Sheets

(56) References Cited

U.S. PATENT DOCUMENTS

| | | | |
|---|---|---|---|
| 6,016,460 A | 1/2000 | Olin et al. | |
| 6,305,350 B1 * | 10/2001 | Livshiz | F02D 31/002 123/339.11 |
| 6,366,847 B1 * | 4/2002 | Sun | F02D 41/18 123/494 |
| 6,430,515 B1 * | 8/2002 | Sanyal | F02D 41/18 702/105 |
| 6,445,996 B1 * | 9/2002 | Corbeels | F02D 41/0002 701/104 |
| 6,505,505 B1 * | 1/2003 | Henzinger | G01L 23/24 73/114.18 |
| 6,688,287 B2 * | 2/2004 | Machida | F01L 1/34 123/406.12 |
| 6,705,296 B2 * | 3/2004 | Horstmann | F02D 41/222 123/494 |
| 7,171,301 B2 * | 1/2007 | Yu | F02D 41/221 701/107 |
| 7,469,687 B2 * | 12/2008 | Mai | F02D 41/0045 123/520 |
| 7,685,871 B2 * | 3/2010 | Sinnamon | G01M 15/106 73/114.69 |
| 8,612,120 B2 * | 12/2013 | Katsumata | F02D 23/00 123/90.15 |
| 8,676,472 B2 * | 3/2014 | Tsukamoto | F02D 41/18 701/103 |
| 2012/0103307 A1 | 5/2012 | Javaherian et al. | |

OTHER PUBLICATIONS

Anonymous, "Electric Park Brake: Drive Away Release Strategy for vehicles with manual transmission®," IPCOM No. 000129301, Published Oct. 5, 2005, 4 pages.

* cited by examiner

METHOD FOR INFERRING BAROMETRIC PRESSURE AT LOW THROTTLE ANGLES

BACKGROUND/SUMMARY

An accurate assessment of barometric pressure (BP) may be beneficial for improved operation of a vehicle. For example, diagnostic functions and engine strategies benefit from having an estimate of barometric pressure. However, including a BP sensor in the vehicle may increase vehicle cost. In some examples, BP may instead be inferred from existing sensors on the vehicle such as a manifold absolute pressure (MAP) sensor. For example, BP may be inferred as the MAP sensor reading plus a small pressure drop across a throttle of the engine.

One example approach is shown by Sanyal et al. in U.S. Pat. No. 6,430,515. Therein, BP is based on an output of a MAP sensor and a pressure drop across the intake system, the pressure drop based on mass air flow. However, the pressure drop and mass air flow relationship may assume a fixed physical geometry for the intake system. Since the throttle position affects the physical geometry of the intake system, the BP may only be calculated when the throttle position is above a predetermined threshold position.

However, the inventors herein have recognized various issues with such an approach. As one example, determining the BP based on the MAP sensor output and the pressure drop across the intake system may only be accurate at larger throttle openings such as wide open throttle (WOT). Thus, the BP estimate may have decreased accuracy during engine operation wherein the throttle is partially closed (e.g., at smaller throttle angles). As a result, engine control based on BP may be less accurate during conditions when the throttle angle is below a threshold throttle angle.

In one example, the issues described above may be addressed by a method for, during throttle angles less than a threshold and while an engine is carrying out combustion, adjusting an operating condition of the engine based on barometric pressure, the barometric pressure based on a current manifold pressure relative to a reference manifold pressure at a current throttle angle and reference barometric pressure. For example, a ratio of the barometric pressure (BP) at a current altitude (at which the vehicle is operating) to the BP at a reference altitude (e.g., the reference BP) may be substantially the same as a ratio of manifold pressure (MAP) at the current altitude (e.g., current MAP) to a MAP value calculated at the reference altitude (e.g., reference MAP). The reference BP may be based on a measured MAP (e.g., measured with a MAP sensor) at wide open throttle (WOT), a measured MAP at engine key-on (e.g., engine start-up), or a pre-determined BP at a reference altitude (e.g., BP at sea level). Further, the reference MAP may be determined based on one or more of a current throttle angle, the reference BP, engine speed, mass air flow, and/or cam position. As such, the reference MAP may be determined at the reference BP and current throttle angle (or mass air flow). Additionally, during throttle angles greater than the threshold, the method may include determining BP based on the current MAP (e.g., measured by the MAP sensor) and a pressure drop across an intake throttle. An engine controller may then adjust the operating condition of the engine, such as cylinder air charge, air-fuel ratio, spark timing, and/or EGR flow, based on the determined BP. In this way, BP may be determined at any throttle angle of the intake throttle, thereby resulting in more accurate and consistent engine control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
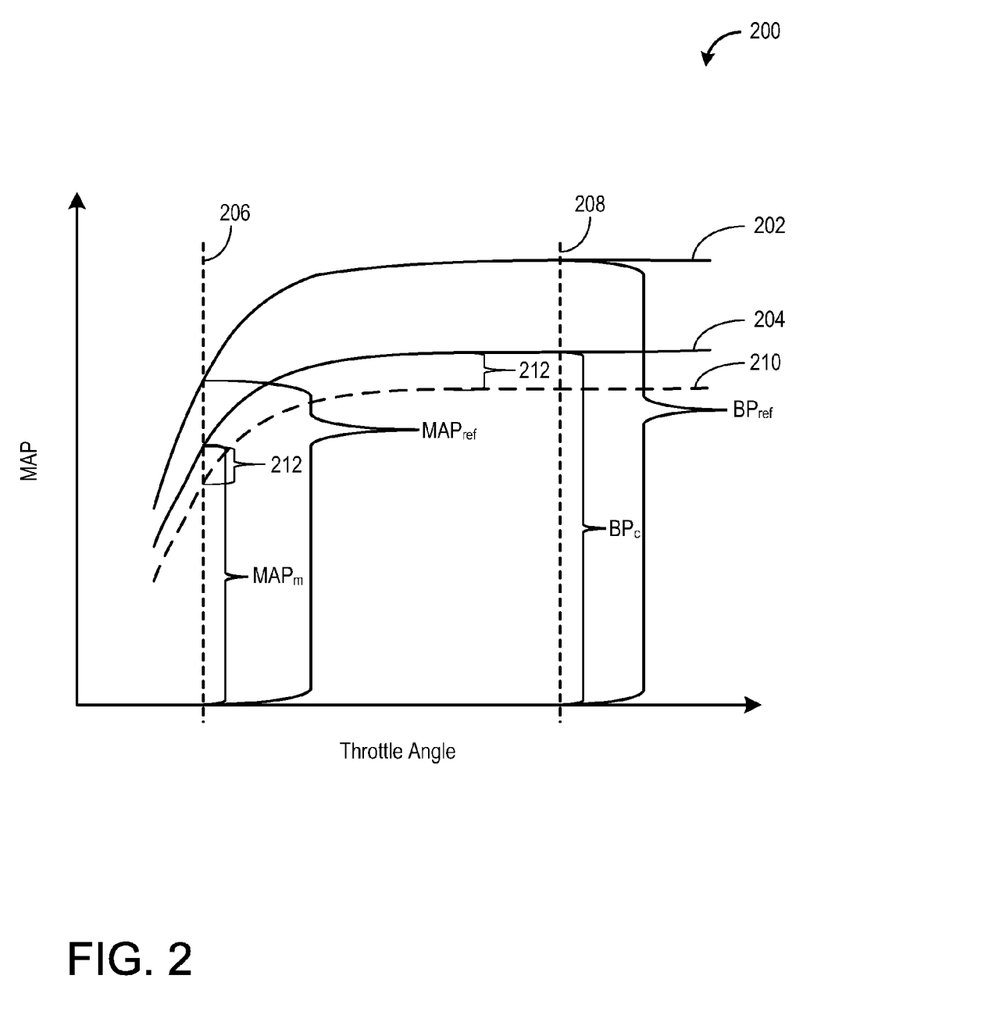
FIG. 2 is a graph showing a relationship between manifold pressure and barometric pressure at different throttle angles.
Figure 3:
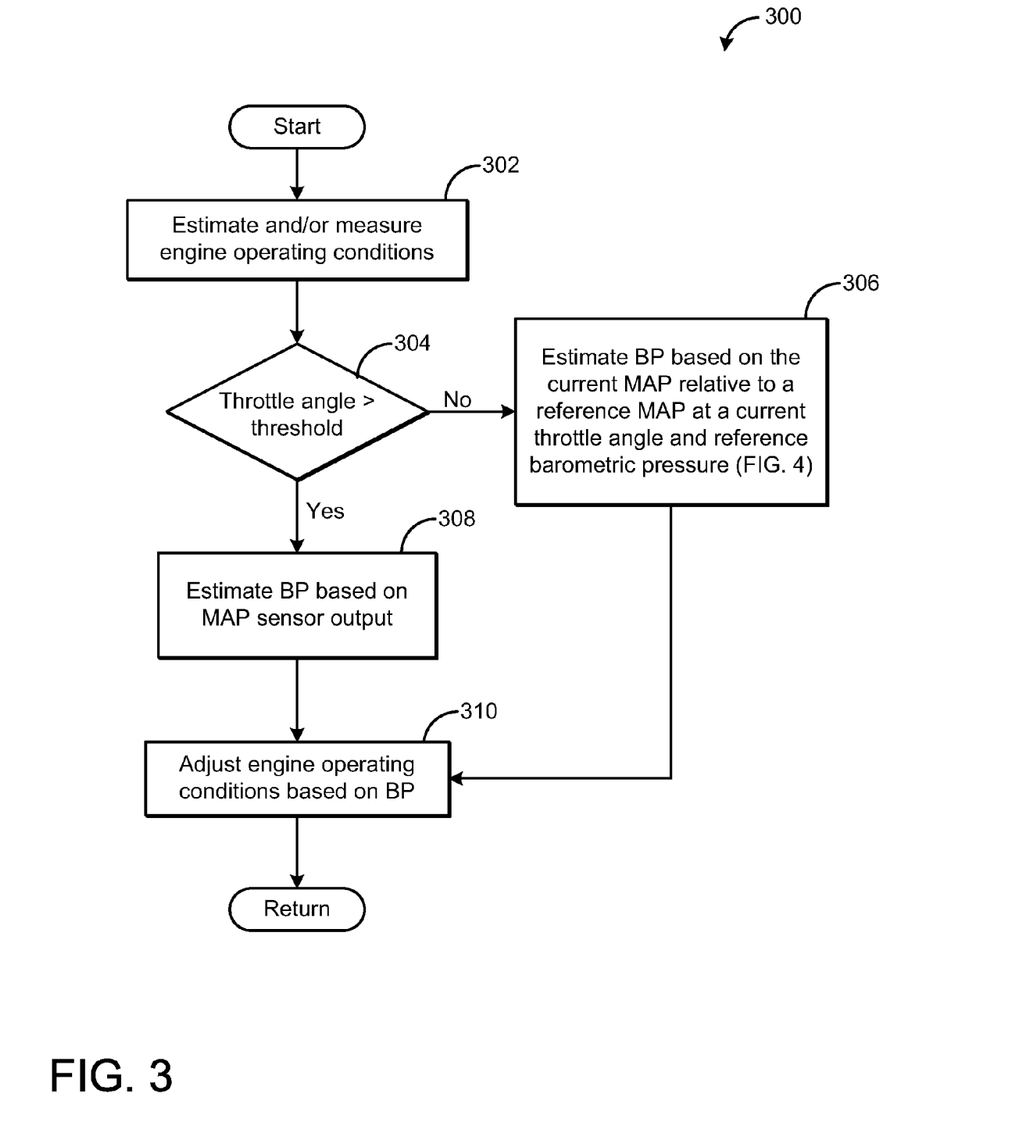
FIG. 3 is a flow chart of a method for estimating barometric pressure based on throttle angle.
Figure 6:
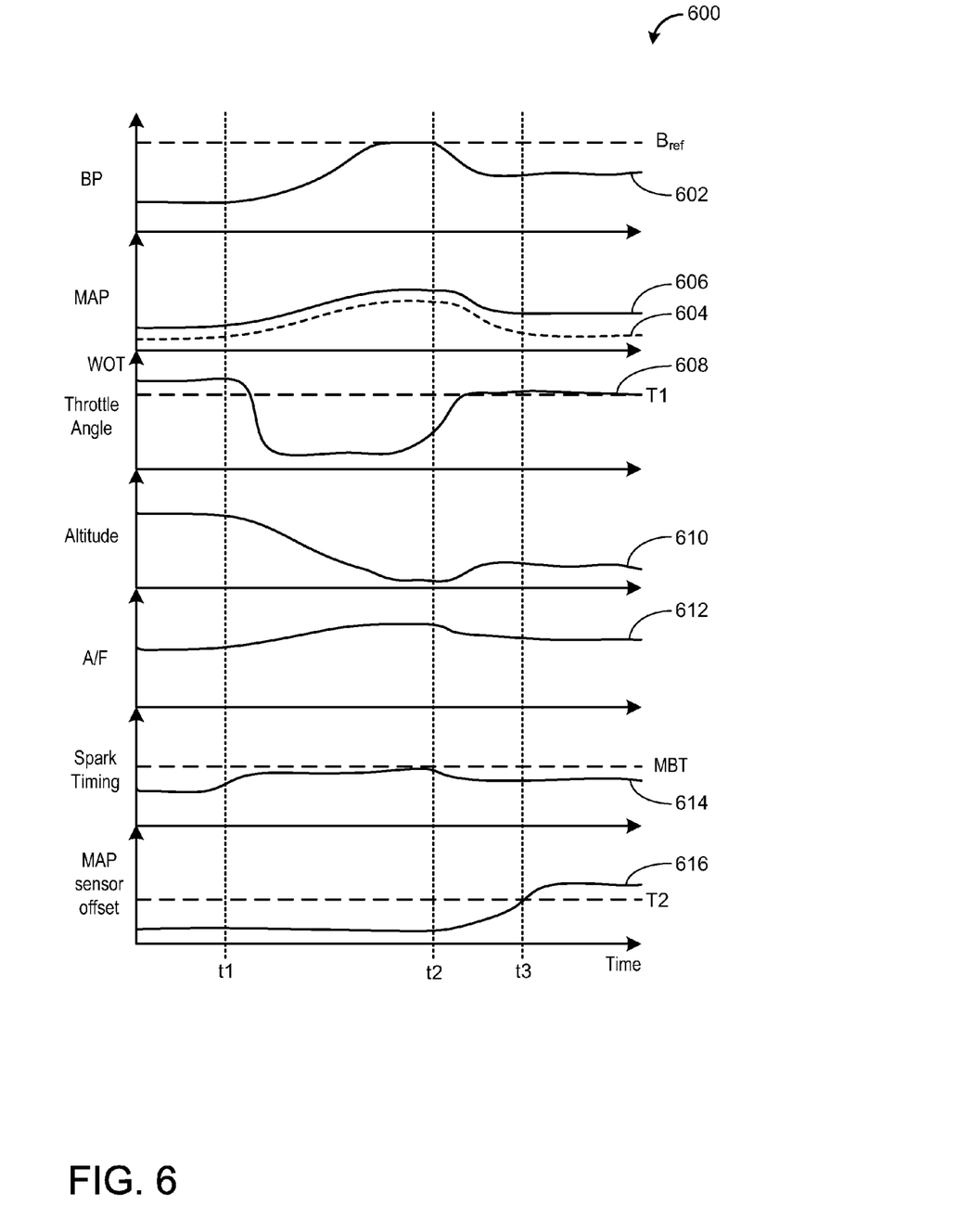
FIG. 6 is a graph of example adjustments to engine operation based on an estimated barometric pressure.

The following description relates to systems and methods for estimating barometric pressure based on a reference barometric pressure and manifold pressures at two different altitudes. In some examples, an engine system, such as the engine system shown in FIG. 1, may not include a barometric pressure (BP) sensor. However, engine operation may be based on current BP. In one example, when the engine does not include a BP sensor, BP may be estimated based on MAP values measured from a MAP sensor positioned in an intake manifold of the engine. However, at smaller throttle angles (e.g., throttle angle of an intake throttle less than a threshold), basing BP on MAP sensor output and a pressure drop across the intake throttle alone may result in BP estimates of reduced accuracy. Thus, when the engine is operating at throttle angles less than the threshold, BP may be based instead on MAP values at two different engine operating conditions. FIG. 3 shows a method for determining BP based on throttle angle. More specifically, for any given throttle angle, engine speed, and cam position, a ratio between MAP sensor readings at two different altitudes (or BP) may be the same. The relationship between MAP sensor readings at two different altitudes is shown at FIG. 2. Further, the ratio between MAP sensor readings at two different altitudes may be substantially the same as a ratio between BP at the two different altitudes. These ratios may be used in a method shown at FIG. 4 for estimating BP at smaller throttle angles. In this way, BP may be estimated at any throttle angle using one of the methods described above, the chosen method based on the intake throttle angle relative to a threshold throttle angle. FIG. 6 shows example adjustments to engine operation based on the estimated BP.

Figure 5:
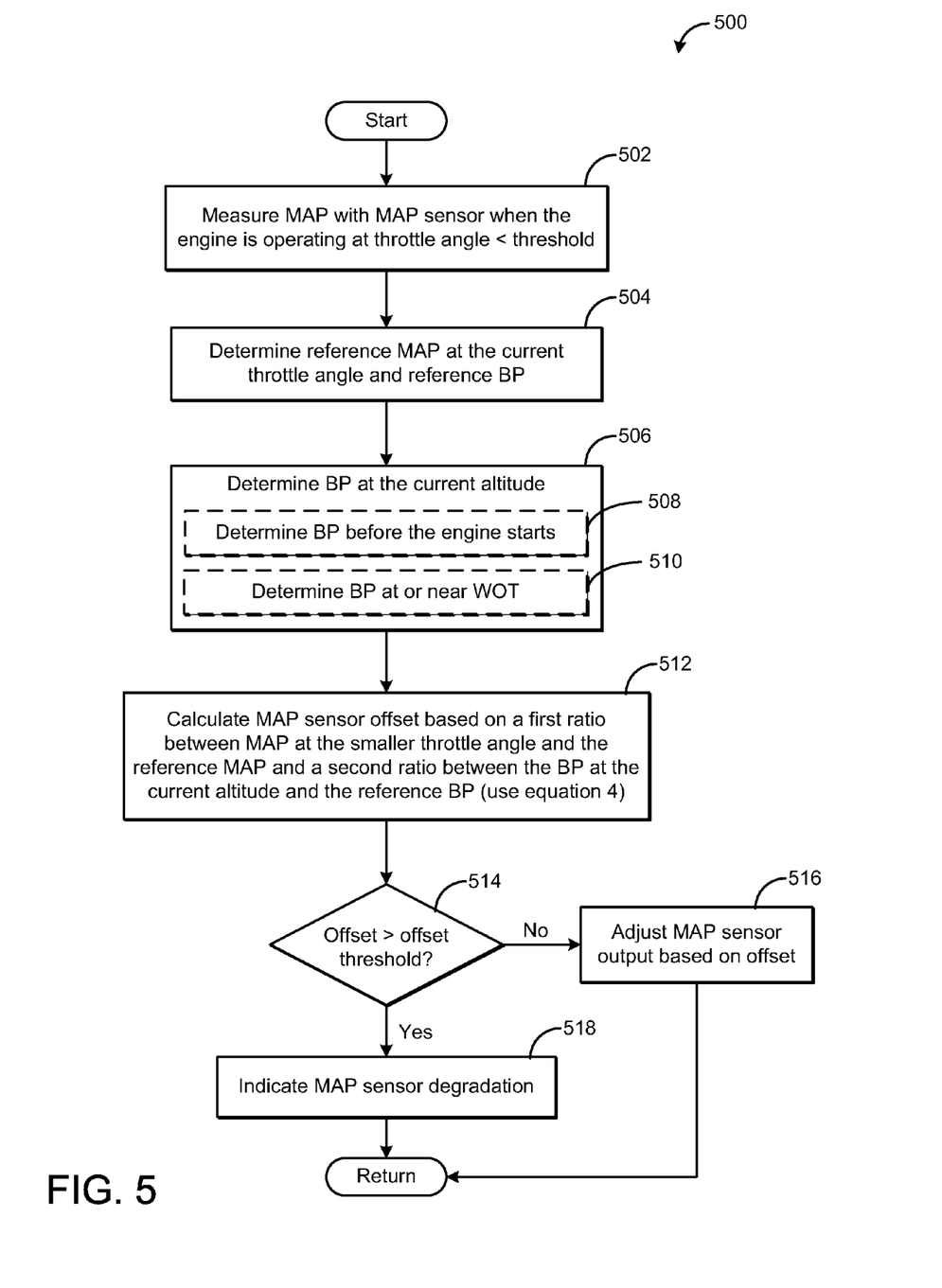
FIG. 5 is a flow chart of a method for determining an offset of a manifold pressure sensor.

In some examples, the MAP sensor of the engine may have an offset causing the measured MAP to differ from the actual MAP. Further, the MAP sensor may become degraded, as evidenced by the offset increasing above an offset threshold. However, the engine system may not include a mass air flow (MAF) sensor or other pressure sensor for comparing pressure measurements to MAP sensor readings and subsequently diagnosing the MAP sensor. As a result, engine control based on MAP sensor readings may have reduced accuracy. In one example, the MAP sensor offset may be determined using the ratios between BP and MAP at two different altitudes, as described above. FIG. 5 shows a method for determining the MAP sensor offset and then adjusting the MAP sensor output based on the determined offset. Further, the engine controller may indicate degradation of the MAP sensor if the offset increases above the offset threshold. In this way, adjusting the MAP sensor output by the MAP sensor offset may result in more accurate BP estimates, MAP estimates, and engine control.

Figure 1:
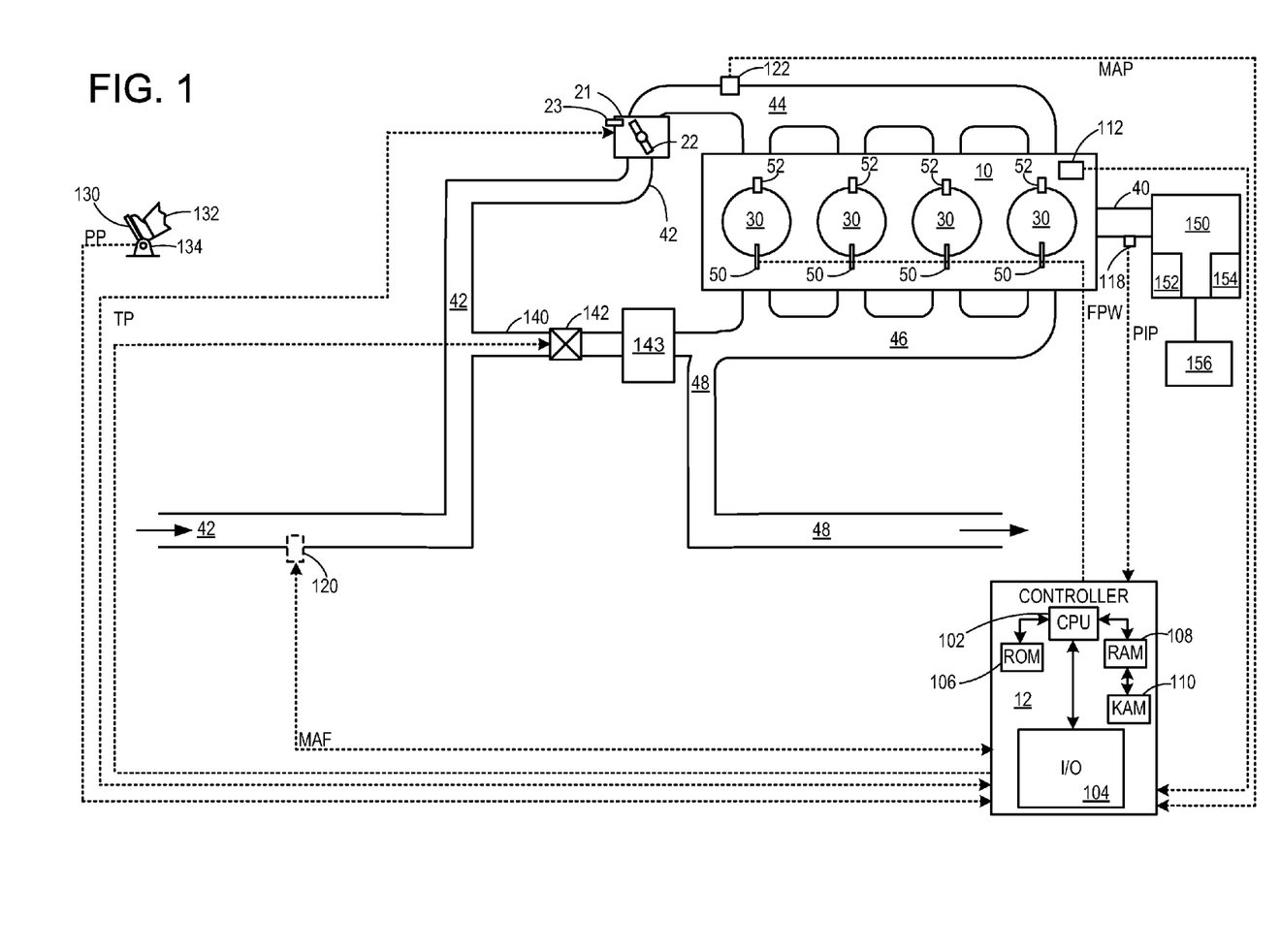
FIG. 1 is a schematic diagram of an example engine system including a manifold pressure sensor.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque). As the transmission shifts to a lower gear, the engine speed (Ne or RPM) increases, increasing engine airflow. An intake manifold vacuum generated by the spinning engine may be increased at the higher RPM.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 and/or intake manifold 44 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42. Additionally, the throttle position or throttle angle may be determined with a throttle position sensor 23 positioned at the throttle 21. In one example, the throttle position sensor 23 may measure the angle of the throttle plate 22 relative to the direction of air flow through the intake passage 42. For example, when the throttle plate 22 is completely closed (and blocking airflow through the intake passage 42), the throttle angle may be approximately zero degrees. When the throttle plate 22 is completely open (and perpendicular to airflow) the throttle angle may be approximately 90 degrees. As discussed further below, the throttle angle may affect a pressure drop across the throttle and across the intake system. Thus, the throttle angle may also affect a barometric pressure (BP) estimate.

Further, in the disclosed embodiments, an exhaust gas recirculation (EGR) system may route a desired portion of exhaust gas from the exhaust passage 48 to the intake passage 42 via an EGR passage, such as EGR passage 140. The amount of EGR provided to the intake passage 42 may be varied by the controller 12 via an EGR valve, such as EGR valve 142. Under some conditions, the EGR system may be used to regulate the temperature of the air and fuel mixture within the combustion chamber. When operable, the EGR system may induce the formation of condensate, particularly when the air is cooled by the charge air cooler, as described in more detail below. For example, the EGR passage 140 may include a high pressure EGR cooler 143.

The engine 10 may be a non-boosted engine without a turbocharger or a supercharger. As such, the methods described further below with reference to FIGS. 2-6 may be performed in unboosted conditions. In alternate embodiments, the engine 10 may include a turbocharger including a turbine-driven compressor.

The engine 10 may further include one or more oxygen sensors positioned in the intake passage 42 and/or the intake manifold 44. The intake manifold 44 includes a MAP sensor 122 for measuring an absolute manifold pressure (MAP). As discussed further below, the output of the MAP sensor 122 may be used to estimate other engine system pressures such as BP. Additionally, an optional mass air flow (MAF) sensor 120 may be positioned in the intake passage 42, upstream of the throttle 21. In other embodiments, the intake passage 42 may not include the MAF sensor 120 and mass air flow may be estimated using alternate methods, as discussed further below. In some embodiments, the MAP sensor 122 may be the only pressure sensor in the engine intake (e.g., in the intake passage 42 and the intake manifold 44). Additionally, in this embodiment, the engine intake may not include the MAF sensor 120.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from the MAF sensor 120 (if the MAF sensor 120 is included in engine 10); engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from the throttle position sensor 23; and absolute manifold pressure signal, MAP, from sensor 122, as discussed above. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors not depicted may also be present, such as a sensor for determining ambient air temperature and/or humidity, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 3-5.

The system of FIG. 1 provides for an engine system including an intake manifold, a throttle positioned in the intake manifold, a manifold pressure sensor positioned in the intake manifold and configured to determine a measured manifold pressure, and a controller. In one example, the controller may include computer readable instructions for adjusting engine operation responsive to barometric pressure, the barometric pressure based on the measured manifold pressure, and, during engine operation at a throttle angle less than a threshold, the barometric pressure is further based on a reference barometric pressure and a reference manifold pressure at the throttle angle and reference barometric pressure. The reference manifold pressure may be based on an iterative calculation of manifold pressure and mass air flow at the reference barometric pressure and throttle angle and wherein the reference barometric pressure is a predetermined barometric pressure stored in a memory of the controller.

In another example, the controller may include computer readable instructions for adjusting the measured manifold pressure by a manifold pressure sensor offset, the manifold pressure sensor offset based on the measured manifold pressure at a first throttle angle less than a threshold, an estimated barometric pressure at a second throttle angle greater than the first throttle angle, a reference barometric pressure, and a reference manifold pressure at the first throttle angle and reference barometric pressure. The computer readable instructions may further include instructions for indicating degradation of the manifold pressure sensor when the manifold pressure sensor offset is greater than an offset threshold.

As introduced above, a measurement of barometric pressure (BP) may be used by an engine controller (e.g., controller 12 shown in FIG. 1) for various engine diagnostics and control routines. In one example, the controller may use a measurement or estimate of BP to calculate air charge. In another example, the controller may adjust engine operating parameters such as a desired air-fuel ratio, spark timing, and/or desired EGR level (e.g., EGR flow rate) based on the BP.

However, some engine systems (such as the system shown in FIG. 1) may not include a barometric pressure (BP) sensor for determining BP. In these engine systems, BP may be estimated based on measurements from alternate engine sensors and/or engine operating conditions. In one example, BP may be estimated based on MAP measured from the MAP sensor in the intake manifold of the engine. Specifically, BP may be inferred (e.g., estimated) as the MAP sensor reading plus a small pressure drop across the throttle. However, this method of estimating BP may require the throttle to be open enough such that the pressure drop across the throttle is small enough to be modeled as a function of throttle angle and air flow (e.g., mass air flow). In one example, estimating BP in this way may only be accurate at wide open throttle (WOT) or when the throttle angle (or amount of throttle opening) is greater than a threshold. The threshold may be a threshold throttle angle below which the pressure drop across the throttle increases to a level resulting in reduced accuracy of the BP estimate and subsequent engine control.

Thus, during engine operation when the throttle position is below the threshold throttle angle, BP may not be estimated. Instead, a previous (or most recent) BP estimate may be used for engine actuator and/or operating parameter adjustments. In one example, when the engine is descending from a higher altitude the throttle angle may be below the threshold and the BP may be changing. However, since the BP may not be estimated during this condition, calculations and engine actuator adjustments based on BP may decrease in accuracy.

Instead, BP may be estimated based on MAP values at two different engine operating conditions. For any given throttle angle, engine speed, and cam position, a ratio between MAP sensor readings at two different altitudes (or BP) may be the same. Specifically, an engine running at fixed engine speed and cam position at sea level and the same engine running at the same fixed engine speed and cam position at a higher altitude may have a constant ratio between MAP sensor readings when the engine is swept from a low throttle angle to WOT at the same time. Further, as introduced above, the MAP sensor output may reflect BP at any engine speed and cam position when the throttle is near (within a threshold) or at WOT.

The relationship between MAP sensor readings at two different altitudes is shown in FIG. 2. Specifically, FIG. 2 shows a graph 200 of manifold pressure (MAP) vs. throttle angle. Each line on the graph 200 is at a different BP. Line 202 is for a first BP. The first BP may be a reference BP. In one example, the first BP may be the BP at first altitude such as sea level. Line 204 is for a second BP, the second BP lower than the first BP. As such, the second BP may represent a second altitude higher than the first altitude.

As discussed above, line 202 may represent a reference BP while line 204 may represent the BP at the current elevation (at which the vehicle is operating). Thus, the measured MAP, $MAP_m$, is the MAP measured by the MAP sensor at the current elevation, BP, and engine operating conditions. Further, $MAP_m$ is shown at the current throttle angle, as shown at line 206. The current throttle angle (line 206) may be smaller than the threshold throttle angle, as discussed above. Graph 200 also shows the current BP, $BP_c$, at the current altitude (line 204). The $BP_c$ may be what the MAP sensor would read before the engine starts or at a higher throttle angle such as WOT. Thus, in one example, line 208 may represent WOT. In other examples, line 208 may represent a throttle angle smaller than WOT but larger than the threshold throttle angle.

Graph 200 also shows a reference BP, $BP_{ref}$, on the line 202. In the methods described further below, a reference BP may be chosen at a calibratable reference such as the BP at sea level or BP at engine start-up (e.g., at engine key-on before engine operation). A reference MAP, $MAP_{ref}$, may be calculated (e.g., estimated) at the current throttle angle (line 206) and reference BP (line 202). $MAP_{ref}$ may also be calculated based on the current engine speed and cam position. A method for calculating $MAP_{ref}$ is discussed further below with reference to FIG. 4 and may include an iterative method for determining a MAP value utilizing a throttle model to infer air flow and a volumetric efficiency characterization.

As shown in graph 200, a ratio of the BP at the current altitude, $BP_c$, to the BP at the reference altitude, $BP_{ref}$, may be substantially equal to a ratio of the measured MAP at the current altitude, $MAP_m$, to the calculated MAP at the reference altitude, $MAP_{ref}$. This relationship may be represented by equation 1:

$$\frac{BP_c}{BP_{ref}} = \frac{MAP_m}{MAP_{ref}} \quad (1)$$

Equation 1 may be rearranged to determine $BP_c$, as shown in equation 2:

$$BP_c = \frac{MAP_m BP_{ref}}{MAP_{ref}} \quad (2)$$

In this way, BP at any engine operating conditions, during vehicle operation, may be estimated using the pressure relationships shown in FIG. 2.

In some examples, the MAP sensor may become degraded or include an offset that may reduce the accuracy of the output MAP value. The MAP sensor offset may be determined using the pressure ratio relationship described above. After determining the sensor offset, the MAP sensor output may be corrected using the determined offset. FIG. 2 shows an example MAP sensor offset at 212. The MAP sensor offset 212 may be a substantially constant pressure value which may cause the MAP sensor to read a pressure an amount higher or lower than the actual MAP. The amount may be the offset 212. As shown in FIG. 2, the offset shown at 212 may cause the MAP sensor output to read as shown at line 210 instead of reading the actual MAP, as shown at line 204. In one example, the offset 212 may be a negative offset such that the MAP sensor reads a MAP value lower than the actual MAP. If the offset (e.g., absolute value of the offset) increases above an offset threshold, the controller may indicate to a vehicle operator that the MAP sensor is degraded.

To determine the offset, an offset variable may be added to equation 1, as shown in equation 3:

$$\frac{BP_c + \text{offset}}{BP_{ref}} = \frac{MAP_m + \text{offset}}{MAP_{ref}} \quad (3)$$

Rearranging to solve for the offset results in equation 4:

$$\text{offset} = \frac{(BP_c MAP_{ref}) - (MAP_m BP_{ref})}{BP_{ref} - MAP_{ref}} \quad (4)$$

However, now in equation 4, the BP at the current altitude, $BP_c$, is now the MAP sensor output (e.g., reading) before the engine starts (e.g., at engine key-on) or when the engine is running at or near (within a threshold of) WOT. Additionally, the current measure MAP, $MAP_m$, is the MAP measured from the MAP sensor when the engine is operating at a smaller throttle angle (e.g., throttle angle below the threshold throttle angle).

Further details on determining the offset of the MAP sensor are discussed below with reference to FIG. 5. After determining the offset, the MAP sensor output may be adjusted by the offset. When determining the BP at any operating condition (at lower throttle angles), as shown in equation 1, $MAP_m$ may include the offset correction.

In this way, an engine method may comprise, during throttle angles less than a threshold and while an engine is carrying out combustion, adjusting an operating condition of the engine based on barometric pressure, the barometric pressure based on a current manifold pressure relative to a reference manifold pressure at a current throttle angle and reference barometric pressure. In one example, the reference barometric pressure is based on a measured manifold pressure at one or more of wide open throttle or engine start-up. In another example, the reference barometric pressure is a pre-determined pressure at a reference altitude.

The current manifold pressure may be based on a manifold pressure measured by a manifold pressure sensor and a sensor offset of the manifold pressure sensor, the manifold pressure sensor positioned in an intake manifold of the engine. The method may further comprise estimating the sensor offset based on a first ratio between the measured manifold pressure and the reference manifold pressure and a second ratio between a current barometric pressure and the reference barometric pressure, the current barometric pressure based on an output of the manifold pressure sensor during one of wide open throttle or engine start-up.

In one example, the method may include estimating the reference manifold pressure iteratively based on the current throttle angle, reference barometric pressure, engine speed, and cam position. In another example, the method may include estimating the reference manifold pressure based on mass air flow measured from a mass air flow sensor, throttle angle, and the reference barometric pressure. In yet another example, the method may include estimating the reference manifold pressure based on engine volumetric efficiency, the engine volumetric efficiency based on engine speed, cam position, and measured mass air flow.

The method may further comprise, during throttle angles greater than the threshold and while an engine is carrying out combustion, adjusting an operating condition of the engine based on barometric pressure, the barometric pressure based on the current manifold pressure and a pressure drop across an intake throttle. In one example, adjusting the operating condition of the engine based on barometric pressure includes one or more of adjusting cylinder air charge, air-fuel ratio, spark timing, or EGR flow.

As another embodiment, an engine method may comprise indicating degradation of a manifold pressure sensor based on a sensor offset, the sensor offset based on a manifold pressure measured at a first throttle angle, a barometric pressure at a second throttle angle, a reference manifold pressure at the first throttle angle and reference barometric pressure, and the reference barometric pressure. As one example, the first throttle angle may be less than a threshold throttle angle and the second throttle angle may be greater than the threshold throttle angle. Additionally, the reference barometric pressure may be a pre-determined pressure at a reference altitude, the reference altitude being sea level.

In one example, indicating degradation includes indicating degradation responsive to the sensor offset being greater than an offset threshold. The offset threshold may be based on one or more of a pre-determined sensor offset or a desired manifold pressure sensor accuracy percentage. The method may further comprise determining the barometric pressure based on an output of the manifold pressure sensor during one of engine operation at wide-open-throttle or engine key-on.

The manifold pressure may be measured with the manifold pressure sensor while an engine in which the manifold pressure is installed is carrying out combustion and when the first throttle angle is smaller than a threshold throttle angle, the manifold pressure sensor positioned in an intake manifold of the engine. The method may further comprise estimating the reference manifold pressure iteratively based on the first throttle angle, reference barometric pressure, engine speed, and cam position. In another example, the method may comprise estimating the reference manifold pressure based on a mass air flow estimate during operation at the first throttle angle and engine volumetric efficiency, the engine volumetric efficiency based on engine speed, cam position, and the estimated mass air flow.

The method may further comprise adjusting an output of the manifold pressure sensor by the sensor offset to determine an adjusted manifold pressure. Engine operation may then be adjusted based on the adjusted manifold pressure.

Turning now to FIG. 3, a method 300 is shown for estimating barometric pressure (BP) based on a throttle angle of an intake throttle. Specifically, method 300 shows determining which method and engine operating conditions to use to calculate the barometric pressure at the current altitude (e.g., current barometric pressure), the method chosen based on the throttle angle relative to a threshold throttle angle. Instructions for carrying out method 300 may be stored in a memory of a controller (such as controller 12 shown in FIG. 1). Further, the controller may execute the method 300, described below.

Method 300 begins at 302 by estimating and/or measuring engine operating conditions. Engine operating conditions may include engine speed and load, throttle angle, MAP, MAF, cam position, EGR flow, engine temperatures, etc. At 304, the method includes determining if the throttle angle of the intake throttle (e.g., throttle 21 shown in FIG. 1) is greater than a threshold throttle angle. In one example, the throttle angle may be determined from a throttle position sensor on the intake throttle. The threshold throttle angle may be a throttle angle below which the pressure drop across the throttle increases to a level resulting in reduced accuracy of the BP estimate and subsequent engine control. Thus, estimating BP based on MAP may only be accurate (e.g., to a desired percentage accuracy such as 90%) for throttle angles above the threshold throttle angle. Thus, if the throttle angle is greater than the threshold throttle angle (e.g., at or near WOT), the method continues on to 308 to estimate BP based on the MAP sensor output (e.g., current MAP). In some examples, the BP may be based on the MAP sensor output plus a pressure drop across the throttle. In other examples, such as at WOT, the BP may be estimated to be substantially equal to the MAP sensor output (e.g., BP approximately the same as MAP at WOT). As discussed above, the pressure drop across the throttle may be modeled as a function of throttle angle and air flow through the throttle (e.g., mass air flow).

Alternatively at 304, if the throttle angle is not greater than the threshold throttle angle, the method continues on to 306. At 306, the controller may estimate (e.g., calculate) BP based on the current MAP (measured by the MAP sensor) relative to a reference MAP at the current throttle angle and reference barometric pressure. The method at 306 is presented in further detail at FIG. 4. After estimating the current BP using one of the methods at 308 or 306, the method continues on to 310 to adjust engine operating conditions based on the estimated BP. The engine operating conditions may include one or more of air charge (e.g., amount of air entering the engine cylinder for combustion), a desired engine air-fuel ratio, spark timing, and/or desired EGR level. In one example, as the BP decreases, the controller may retard spark timing and/or decrease the air-fuel ratio.

Figure 4:
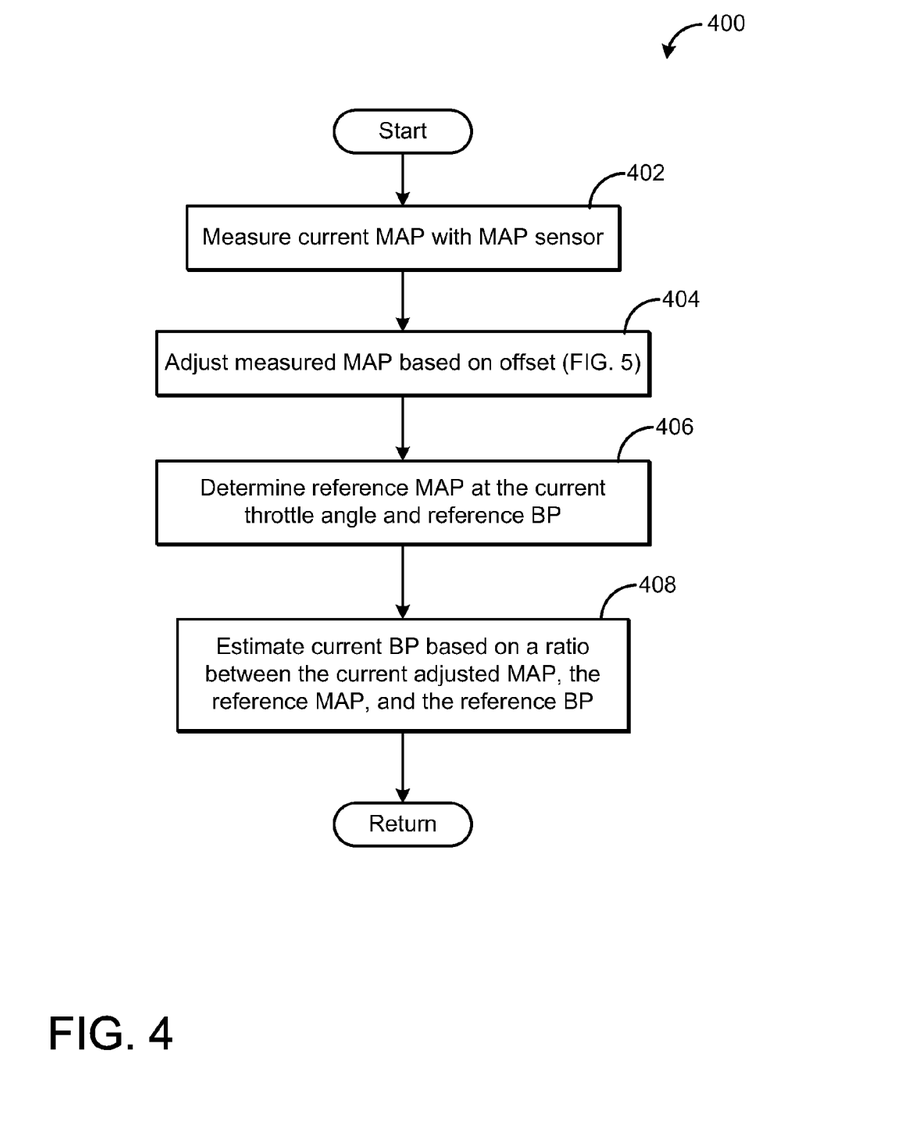
FIG. 4 is a flow chart of a method for estimating barometric pressure at smaller throttle angles.

FIG. 4 shows a method 400 for estimating BP based on a measured MAP relative to a reference MAP and reference BP. Method 400 continues from method 300 after determining that the throttle angle of the intake throttle is less than (or equal to) the threshold throttle angle. As a result, BP may be determined using a relationship between a ratio of barometric pressures at two different altitudes (e.g., elevations) and MAPs at the two different altitudes, as introduced above with reference to FIG. 2.

Method 400 beings at 402 by measuring the current MAP (e.g., the MAP at the current altitude of the vehicle) with the MAP sensor, the MAP sensor positioned in the intake manifold. At 404, the controller may adjust the measured MAP based on a MAP sensor offset. The MAP sensor offset (or error) may be determined using a pressure ratio method shown at FIG. 5. In other embodiments, method 400 may not include adjusting the measure MAP by the offset and instead use the measured MAP for determining BP at 408.

At 406, the method includes determining a reference MAP at the current throttle angle and reference BP. In one example, a pre-determined reference BP may be stored in the memory of the controller. For example, the reference BP may be the BP at sea level or another reference altitude (e.g., an altitude greater than sea level). In another example, the reference BP may be determined before engine operation, at vehicle start-up (e.g., engine key-on). The reference MAP may be determined with an iterative method using a throttle model and engine volumetric efficiency. Specifically, the throttle model may use the current throttle angle, MAP, and an upstream pressure (e.g., reference BP) to infer mass air flow. This method may be used if the engine does not include a MAF sensor. However, if the engine does include a MAF sensor, the reference MAP may be determined using the throttle model and the measured MAF, current throttle angle, and reference BP.

The engine volumetric efficiency may then be used to infer MAP from the inferred mass air flow, current engine speed, and current cam position. At any given engine speed and cam position, MAP is a function of air charge, as shown by equation 5:

$$\text{air charge} = \frac{\text{air flow}}{\text{engine speed} * \frac{\text{number of cylinders}}{2}} \quad (5)$$

The air flow in equation 5 is the inferred air flow from the throttle model. MAP may then be inferred from the resulting air charge value. The calculation of equation 5 and the throttle model equation are performed iteratively in order to determine the reference MAP at the current throttle angle and reference BP. Alternatively, if the engine includes a MAF sensor, or other means of estimating mass air flow, the controller may estimate the reference MAP based on the engine volumetric efficiency and estimated (or measured) mass air flow using equation 5.

At 408, the method includes estimating (e.g., calculating) the current BP (e.g., the BP at the current altitude) based on a ratio between the current adjusted MAP determined at 404, the reference MAP determined at 406, and the reference BP. This is done using equation 2, as described above and reproduced below:

$$BP_c = \frac{MAP_m BP_{ref}}{MAP_{ref}} \quad (2)$$

In equation 2, $BP_c$ is the BP at the current driving altitude, $MAP_m$ is the MAP measured by the MAP sensor and optionally adjusted by the sensor offset, $BP_{ref}$ is the reference BP, and $MAP_{ref}$ is the reference MAP.

In one example, the BP estimation with method 400 may be performed continuously while the throttle angle is below the threshold throttle angle. In other examples, the BP estimation with method 400 may be performed after a threshold change in MAP (e.g., when the measured MAP changes by a threshold amount, the controller recalculates the BP) while the throttle angle is below the threshold throttle angle. In yet another example, the BP estimation with method 400 may be performed after a duration passes since the last BP estimation. In this way, the BP estimation may be performed at set time intervals.

Turning now to FIG. 5, a method 500 is shown for determining the offset of the MAP sensor. Method 500 begins at 502 by measuring MAP with the MAP sensor when the engine is operating at a throttle angle less than the threshold throttle angle. In another example, MAP may be measured when the engine is operating at any throttle angle smaller than WOT. The throttle angle at which the MAP is measured at 502 may be referred to herein as the first throttle angle.

At 504, the method includes determining the reference MAP at the current throttle angle (e.g., first throttle angle) and reference BP. The method at 504 may include an iterative method using a throttle model and engine volumetric efficiency relationship, as discussed at 406 in FIG. 4. Thus, the method at 504 may follow the method described at 406. Since the engine may not include a MAF sensor, air flow (e.g., mass air flow) is inferred from the throttle model and then used in the volumetric efficiency relationship. The resulting MAP value at 504 is a calculated MAP value based on throttle angle, the reference BP (e.g., pre-determined BP at a reference altitude such as sea level), engine speed, and cam position. In alternate embodiments, mass air flow may be estimated using an alternate method based on alternate sensor readings or engine operating conditions. This estimated mass air flow may then be used with the volumetric efficiency equation (equation 5) to determine the reference MAP at the reference BP and the current mass air flow (instead of the current throttle angle). In yet another example, method 500 may still be used to determine the offset if the engine does include a MAF sensor. In this embodiment, the method at 504 may include using the MAF sensor output to determine mass air flow and, subsequently, the reference MAP.

At 506, the method includes determining the BP at the current altitude and a second throttle angle, the second throttle angle different than the first throttle angle. The BP at the current altitude may be the MAP sensor output (e.g., reading) before the engine starts (e.g., at engine key-on) or the MAP sensor output at or near (e.g., with a threshold of) WOT. In this way, BP at the current altitude may be the MAP measured by the MAP sensor at one of the conditions at 508 or 510. Further, the second throttle angle may be larger than the first throttle angle.

After 506, the method continues on to 512 to calculate the MAP sensor offset based on a first ratio between MAP at the smaller throttle angle (e.g., $MAP_m$ shown in equations 3 and 4 at the first throttle angle) and the reference MAP and a second ratio between the BP at the current altitude (e.g., $BP_c$ shown in equations 3 and 4 at the second throttle angle) and the reference BP. The MAP sensor offset is added to any values measured from the MAP sensor (e.g., $MAP_m$ and $BP_c$). The first ratio and the second ratio are then set equal to each other, as shown in equation 3, and the offset is solved for, as shown in equation 4:

$$\text{offset} = \frac{(BP_c MAP_{ref}) - (MAP_m BP_{ref})}{BP_{ref} - MAP_{ref}} \quad (4)$$

Thus, the method at 512 includes inputting the MAP and BP values determined at 502-506 and then solving equation 4 for the sensor offset.

At 514, the method includes determining if the calculated sensor offset is greater than an offset threshold. The offset threshold may be based on a desired MAP sensor accuracy or a pre-determined base sensor offset determined for the MAP sensor. If the calculated offset is not greater than the offset thereshold, the method continues on to 516 to adjust the MAP sensor output based on the offset. The method at 516 may include adding the offset to the MAP sensor reading. In this way, all MAP values measured by the MAP sensor may be adjusted by this sensor offset. The MAP sensor offset may be applied to the methods at 306 and 308 of FIG. 3. Engine actuator or operating condition adjustments based on BP and/or MAP may then be adjusted based on BP and MAP values that have been adjusted by the offset. Thus, the MAP sensor offset may be applied to readings from the MAP sensor when the engine is operating at any throttle angle. Alternatively at 515, if the MAP sensor offset is greater than the offset threshold, the method continues on to 518 to indicate MAP sensor degradation. In one example, the method at 518 may include notifying the vehicle operator that the MAP sensor is degraded. In another example, the method at 518 may include both indicating MAP sensor degradation and continuing to adjust the MAP sensor offset based on the offset.

FIG. 6 shows a graphical example of engine operating condition (e.g., parameter) adjustments responsive to an estimated barometric pressure (BP). Specifically, graph 600 shows changes in barometric pressure (BP) at plot 602, changes in a measured MAP at plot 604, changes in an adjusted MAP at plot 606, changes in throttle angle at plot 608, changes in a traveling altitude (e.g., elevation at which the vehicle is traveling) at plot 610, changes in an engine air-fuel ratio at plot 612, changes in spark timing at plot 614, and changes in a MAP sensor offset at plot 616. As discussed above, the engine may not include a BP sensor. As such, the BP at plot 602 may be an estimated BP estimated from an output of a MAP sensor and additional engine operating conditions based on the throttle angle relative to a threshold throttle angle, T1. The measured MAP may be measured by the MAP sensor. In some examples, the MAP sensor may have an offset resulting in an error between the MAP the sensor measures and the actual MAP. Thus, as described above at FIG. 5, the sensor offset may be determined and then used to adjust the output of the MAP sensor (e.g., the measured MAP). Plot 606 shows the offset-corrected adjusted MAP.

Prior to time t1, the throttle may be operating at a throttle angle greater than the threshold throttle angle T1. As a result, the controller may estimate BP based on the measured or adjusted MAP (plots 604 and 606). At time t1, the vehicle may descend from a higher altitude (plot 610). As the altitude decreases, the estimated BP (plot 602) increases. Just after time t1, the throttle angle decreases below the threshold throttle angle T1. Thus, after this time, the controller estimates the BP based on the adjusted MAP (plot 606) and a calculated reference MAP at the current throttle angle and the reference BP, $BP_{ref}$. As described at FIGS. 3-4, the BP may be estimated using a ratio relationship between two BPs and two MAPs at different altitudes while the throttle angle is below the threshold throttle angle T1. While the BP is increasing, the controller may increase the air-fuel ratio (plot 612) and/or advance spark timing closer to MBT (plot 614). In other examples, the controller may adjust additional or alternative engine operating conditions (e.g., via adjusting engine actuators) responsive to the changing BP.

At time t2, the altitude begins to increase, thereby decreasing BP. Additionally, just after time t2, the throttle angle increases above the threshold throttle angle T1 (plot 608). As a result, the controller may return to estimating BP based on the adjusted MAP (plot 606). As the BP decreases, the controller may retard spark timing (plot 614) and/or decrease the air-fuel ratio to make the air-fuel richer (plot 612). At time t3, the MAP sensor offset increases above the offset threshold, T2. In response, the controller may indicate MAP sensor degradation by notifying the vehicle operator. In one example, after time t3 the controller may continue adjusting the measured MAP by the offset. As shown at plots 606 and 604, the offset is added to the measured MAP (plot 604) to obtain the adjusted MAP (plot 606). Thus, as the offset increases, the difference between the measured MAP and the adjusted MAP increases.

As shown at FIG. 6, during a first condition (as shown between time t1 and time t2), when a throttle angle of an intake throttle is less than a threshold and while an engine is carrying out combustion, adjusting an engine operating condition based on barometric pressure, the barometric pressure based on a ratio between a measured manifold pressure, a reference manifold pressure, and a reference barometric pressure. During a second condition (as shown before time t1 and after time t2), when the throttle angle is greater than the threshold, adjusting the engine operating condition based on barometric pressure, the barometric pressure based on the measured manifold pressure.

The measured manifold pressure is measured by a manifold pressure sensor positioned in an intake manifold of the engine at a current traveling altitude and throttle angle. Further, as shown at plot 606, the measured manifold pressure may be adjusted by a manifold pressure sensor offset, the manifold pressure sensor offset based on the measured manifold pressure, an estimated barometric pressure at a current altitude, the reference manifold pressure at a current throttle angle and the reference barometric pressure, and the reference barometric pressure.

The reference manifold pressure may be an estimated manifold pressure at the reference barometric pressure and throttle angle during the first condition, the reference manifold pressure based on one or more of the throttle angle, mass air flow, cam position, or engine speed. Additionally, the barometric pressure during the second conditions may be further based on a pressure drop across the intake throttle, the pressure drop based on throttle angle and mass air flow. As shown after time t2, adjusting the engine operating condition based on barometric pressure may include one or more of decreasing an air-fuel ratio or retarding spark timing in response to decreasing barometric pressure. In one example, the reference barometric pressure is a pre-determined barometric pressure at sea level.

As another embodiment, an engine method comprises adjusting engine operation based on an adjusted manifold pressure, the adjusted manifold pressure based on an offset of a manifold pressure sensor, the offset based a relationship between a manifold pressure at a first throttle angle, a reference manifold pressure, a reference barometric pressure, and a barometric pressure at a second throttle angle. The method further comprises indicating degradation of the manifold pressure sensor responsive to the offset being greater than an offset threshold.

The first throttle angle may be smaller than the second throttle angle. Additionally, in one example, the first throttle angle may be less than a threshold throttle angle and the second throttle angle may be wide open throttle. The method may further comprise estimating the reference manifold pressure based on the first throttle angle, reference barometric pressure, engine speed, and cam position. In one example, the reference barometric pressure is a pre-determined barometric pressure at sea level. Further, the manifold pressure may be measured with the manifold pressure sensor. The barometric pressure may be estimated based on an output of the manifold pressure sensor at one of wide open throttle or engine key-on. The method may further include estimating barometric pressure during throttle angles less than a threshold based on the manifold pressure, the reference manifold pressure, and the reference barometric pressure.

In this way, a technical effect of the invention is achieved by estimating BP at any throttle angle and subsequently adjusting engine operation based on the estimated BP. When a throttle angle of an intake throttle is greater than a threshold, the BP may be estimated based on an output of a MAP sensor and a pressure drop across the intake throttle. Alternatively, when the throttle angle is less than or equal to the threshold, the BP may be estimated may be based on a first ratio between a measured manifold pressure at a current throttle angle and BP and a reference manifold pressure at the current throttle angle and reference BP and a second ratio between the current BP and the reference BP. Further, the output of the MAP sensor may be adjusted based on an offset of the MAP sensor. As a result, engine operation may be adjusted based on adjusted MAP and estimated BP values.

As another embodiment, an engine method may include estimating a reference manifold pressure based on a reference barometric pressure, throttle angle, engine speed, and cam position; measuring a current manifold pressure with a manifold pressure sensor; and estimating a current barometric pressure based on a ratio between the current manifold pressure, the reference manifold pressure, and the reference barometric pressure. As yet another embodiment, an engine method may include measuring a current manifold pressure with a manifold pressure sensor when a throttle angle of an intake throttle is less than a threshold; estimating a reference manifold pressure based on the throttle angle and a reference barometric pressure; estimating a barometric pressure based on an output of the manifold pressure sensor when the throttle angle is at wide open throttle; and estimating an offset of the manifold pressure sensor based on a relationship between the current manifold pressure, the reference manifold pressure, the reference barometric pressure, and the estimated barometric pressure.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
during throttle angles less than a threshold while an engine is carrying out combustion, adjusting one or more of cylinder air charge, air-fuel ratio, spark timing, and exhaust gas recirculation flow based on barometric pressure, the barometric pressure determined by setting the barometric pressure equal to a product of a reference barometric pressure and a ratio of a current manifold pressure to a reference manifold pressure at a current throttle angle.

2. The method of claim 1, wherein the reference barometric pressure is based on a measured manifold pressure at one or more of wide open throttle or engine start-up.

3. The method of claim 1, wherein the reference barometric pressure is a pre-determined pressure at a reference altitude.

4. The method of claim 1, wherein the current manifold pressure is based on a manifold pressure measured by a manifold pressure sensor and a sensor offset of the manifold pressure sensor, the manifold pressure sensor positioned in an intake manifold of the engine.

5. The method of claim 4, further comprising estimating the sensor offset based on a first ratio between the measured manifold pressure and the reference manifold pressure and a second ratio between a current barometric pressure and the reference barometric pressure, the current barometric pressure based on an output of the manifold pressure sensor during one of wide open throttle or engine start-up.

6. The method of claim 1, further comprising estimating the reference manifold pressure iteratively based on the current throttle angle, reference barometric pressure, engine speed, and cam position.

7. The method of claim 1, further comprising estimating the reference manifold pressure based on mass air flow measured from a mass air flow sensor, throttle angle, and the reference barometric pressure.

8. The method of claim 1, further comprising estimating the reference manifold pressure based on engine volumetric efficiency, the engine volumetric efficiency based on engine speed, cam position, and measured mass air flow.

9. The method of claim 1, further comprising during throttle angles greater than the threshold and while the engine is carrying out combustion, adjusting an operating condition of the engine based on barometric pressure, the barometric pressure based on the current manifold pressure and a pressure drop across an intake throttle.

10. An engine method, comprising:
during a first condition, when a throttle angle of an intake throttle is less than a threshold and while an engine is carrying out combustion, adjusting an engine operating condition based on barometric pressure, the barometric pressure determined by setting the barometric pressure equal to a product of a reference barometric pressure and a ratio of a measured manifold pressure to a reference manifold pressure; and
during a second condition, when the throttle angle is greater than the threshold, adjusting the engine operating condition based on barometric pressure, the barometric pressure determined based on the measured manifold pressure,
wherein adjusting the engine operating condition based on barometric pressure includes one or more of adjusting an air-fuel ratio and adjusting spark timing.

11. The method of claim 10, wherein the measured manifold pressure is measured by a manifold pressure sensor positioned in an intake manifold of the engine at a current traveling altitude and current throttle angle.

12. The method of claim 11, further comprising adjusting the measured manifold pressure by a manifold pressure sensor offset, the manifold pressure sensor offset based on the measured manifold pressure, an estimated barometric pressure, the reference manifold pressure at the current throttle angle and the reference barometric pressure, and the reference barometric pressure.

13. The method of claim 12, further comprising estimating the estimated barometric pressure based on an output of the manifold pressure sensor during one of wide open throttle or engine key-on.

14. The method of claim 10, wherein the reference manifold pressure is an estimated manifold pressure at the reference barometric pressure and throttle angle during the first condition, the reference manifold pressure based on one or more of the throttle angle, mass air flow, cam position, or engine speed.

15. The method of claim 10, wherein the barometric pressure during the second condition is further based on a pressure drop across the intake throttle, the pressure drop based on throttle angle and mass air flow.

16. The method of claim 10, wherein adjusting the air-fuel ratio includes decreasing the air-fuel ratio, and wherein adjusting the spark timing includes retarding the spark timing in response to decreasing barometric pressure.

17. The method of claim 10, wherein the reference barometric pressure is a pre-determined barometric pressure at sea level.

18. A system, comprising:
an intake manifold;
a throttle positioned in the intake manifold;
a manifold pressure sensor positioned in the intake manifold and configured to determine a measured manifold pressure; and
a controller with computer readable instructions for adjusting engine operation responsive to barometric pressure, the barometric pressure determined based on the measured manifold pressure during engine operation at a throttle angle greater than a threshold, and the barometric pressure determined by setting the barometric pressure equal to a product of a reference barometric pressure and a ratio of the measured manifold pressure to a reference manifold pressure during engine operation at a throttle angle less than the threshold,
wherein adjusting engine operation includes one or more of adjusting cylinder air charge, air-fuel ratio, spark timing, or exhaust gas recirculation flow.

19. The system of claim 18, wherein the reference manifold pressure is determined via an iterative calculation of manifold pressure and mass air flow at the reference barometric pressure and a current throttle angle and wherein the reference barometric pressure is a pre-determined barometric pressure stored in a memory of the controller.

20. An engine method, comprising:
during throttle angles less than a threshold and while an engine is carrying out combustion, adjusting one or more of cylinder air charge, air-fuel ratio, spark timing, and exhaust gas recirculation flow based on barometric pressure, the barometric pressure based on a current manifold pressure, a reference manifold pressure at a current throttle angle, and a reference barometric pressure, wherein the current manifold pressure is based on a manifold pressure measured by a manifold pressure sensor and a sensor offset of the manifold pressure sensor, the manifold pressure sensor positioned in an intake manifold of the engine, the method further comprising estimating the sensor offset based on a first ratio between the measured manifold pressure and the reference manifold pressure and a second ratio between a current barometric pressure and the reference barometric pressure, the current barometric pressure based on an output of the manifold pressure sensor during wide open throttle or engine start-up.

* * * * *